(12) United States Patent
Matsuoka et al.

(10) Patent No.: US 6,297,663 B1
(45) Date of Patent: Oct. 2, 2001

(54) BUS SYSTEM

(75) Inventors: Toshinobu Matsuoka, Tokyo; Yukihiro Seki; Tsunehiro Tobita, both of Yokohama; Shinichi Suzuki, Ebina, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/417,659

(22) Filed: Oct. 14, 1999

(30) Foreign Application Priority Data

Oct. 14, 1998 (JP) .................................................. 10-292400

(51) Int. Cl.[7] ........................... H03K 17/16; H03K 19/003
(52) U.S. Cl. ........................................... 326/30; 326/82
(58) Field of Search ........................... 326/30, 82, 83, 326/86

(56) References Cited

U.S. PATENT DOCUMENTS 5,023,488    6/1991   Gunning .
5,274,671  * 12/1993  Johnson ............................ 375/36
5,661,416  *  8/1997  Takada et al. ..................... 326/86
5,821,767  * 10/1998  Osaka et al. ...................... 326/30
5,949,252  *  9/1999  Taguchi ............................ 326/86
5,955,889  *  9/1999  Taguchi et al. ................... 326/30
5,982,192  * 11/1999  Saito .............................. 326/30

FOREIGN PATENT DOCUMENTS 8-286793    11/1996    (JP) .

* cited by examiner

*Primary Examiner*—Michael Tokar
*Assistant Examiner*—Daniel D. Chang
(74) *Attorney, Agent, or Firm*—Antonelli, Terry, Stout & Kraus, LLP

(57) ABSTRACT

A bus system has a bus constructed of a plurality of signal lines for transmission of signals, first and second terminating resistors provided at both ends of the respective signal lines, first, second and third modules coupled to the bus between the first and second terminating resistors and being each operative to transmit a signal through an output circuit of open drain type, first series resistors inserted in the respective signal lines between the first and second modules, and second series resistors inserted in the respective signal lines between the second and third modules.

21 Claims, 7 Drawing Sheets

PROPAGATION SPEED (vp) 140 mm/ns
RISE TIME (Tr) 0.8 ns

| NUMBER | WIRING LENGTH | | | V3(v) | L5 + L6 | DECISION |
|---|---|---|---|---|---|---|
| | L5 | L | L6 | | | |
| 1 | 10mm | 10mm | 15mm | 0.984 | 25mm | ○ |
| 2 | 50mm | 10mm | 15mm | 0.976 | 65mm | ○ |
| 3 | 80mm | 10mm | 15mm | 0.952 | 95mm | × |
| 4 | 100mm | 10mm | 15mm | 0.952 | 115mm | × |
| 5 | 150mm | 10mm | 15mm | 0.944 | 165mm | × |

BLIND ZONE OF MODULE 120 IS 0.64~0.96

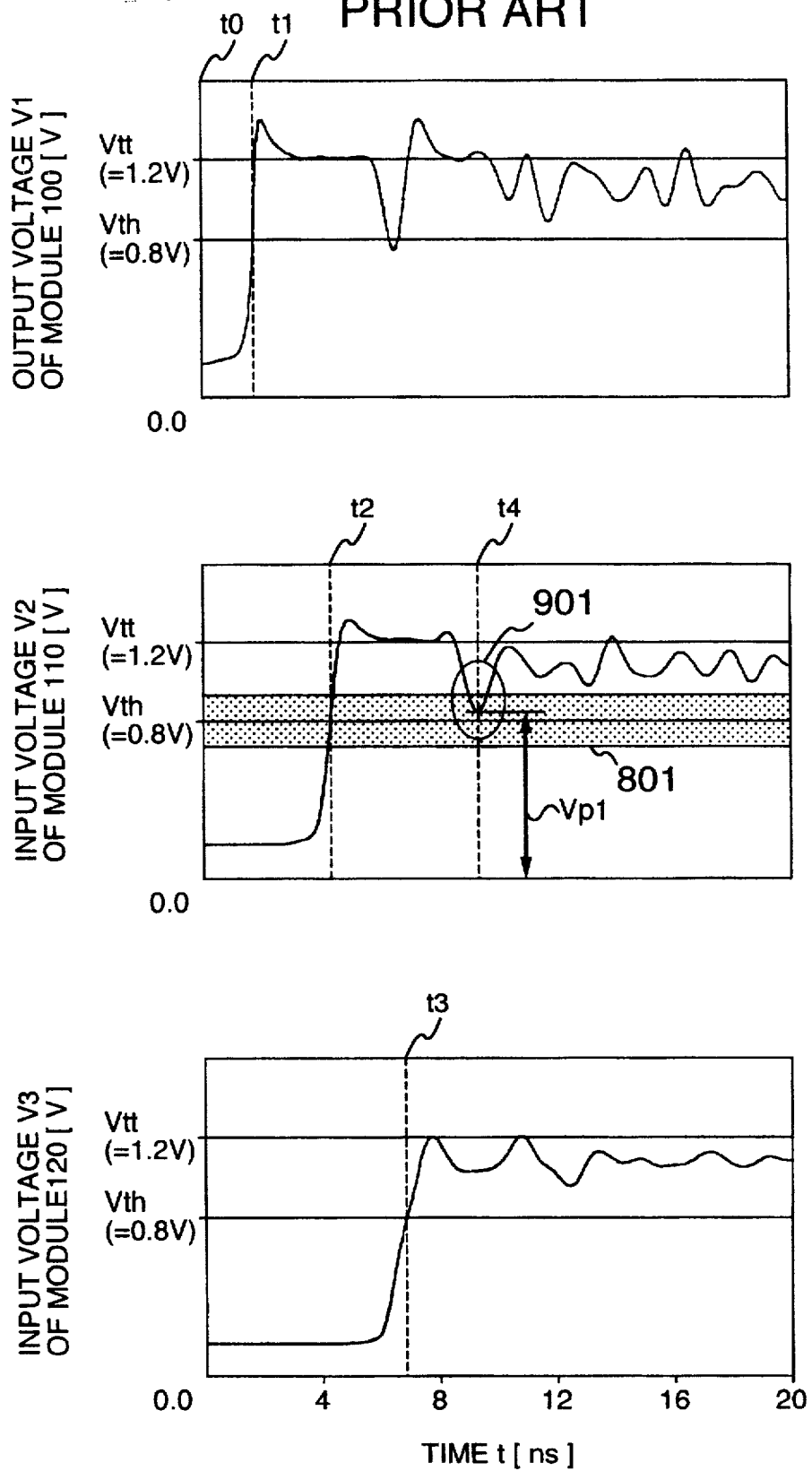

BUS SYSTEM

BACKGROUND OF THE INVENTION

The present invention relates to a bus system for signal transmission and a memory system using the same and more particularly, to a bus system having a bus for coupling a plurality of integrated circuits formed on a printed wiring board.

In recent years, higher performance has been desired in an information processing apparatus such as a personal computer. In order to realize the higher performance, not only performance of a processor for performing the operation process is required to be improved but also transfer throughput of a bus adapted to couple integrated circuits and LSI's (hereinafter referred to as modules) should be improved.

As measures to improve the throughput, either a method of widening the bit width of the bus or a method of increasing the operating frequency of the bus has been available. With a recent tendency toward miniaturization of apparatus, the former method is however difficult to materialize and in general, the latter method has been adopted. As a technique corresponding to the latter method, a low amplitude bus interface utilizing a low signal amplitude of about 1V, such as a GTL (Gunning Transistor Logic) disclosed in, for example, U.S Pat. No. 5,023,488, has been used widely.

In a conventional bus using a TTL (Transistor Transistor Logic), the operating frequency is limited to about 66 MHz but in the low amplitude bus interface such as the GTL, operation even at frequencies amounting up to 100 MHz or more can be permitted.

On the other hand, with the semiconductor fabrication techniques promoted, fineness of the semiconductor internal structure has been accelerated and the operating speed of semiconductors have been increasing. Accordingly, rise time and fall time of a signal are decreased and in signal transmission on the bus, distortion of a signal waveform tends to increase.

Measures to decrease the waveform distortion as above have been taken, including a method in which matching termination is effected at both ends of the bus based on the aforementioned GTL interface, a SSTL (Stub Series Terminated Logic) method disclosed in JP-A-8-286793 and a dumping resistor method applicable to the conventional TTL.

For example, the prior art low amplitude bus system is comprised of modules 100, 110 and 120 and bus parts 201 to 204, as shown in FIG. 6. The modules 100, 110 and 120 are respectively integrated circuits having GTL interfaces.

In the modules 100, 110 and 120, the individual interface circuits include input circuits in the form of comparators 101, 111 and 121, output circuits in the form of MOS transistors 103, 113 and 123, and capacitors 102, 112 and 122 representative of equivalent capacitive components of the input circuits (here, comparators 101, 111 and 121).

Assumptively, in the prior art construction as above, each of the bus parts 201 to 204 has the same characteristic impedance Z0 and terminating resistors 301 and 302 have each a resistance equal to the characteristic impedance Z0 under the direction of matching termination which minimizes reflection from the bus end. The bus takes a wiring form of single stroke wiring starting with the terminating resistor 301, going through the modules 100, 110 and 120 and ending in the terminating resistor 302.

As an example of operation of the bus system shown in FIG. 6, data transfer from module 100 to module 110 will be described. Voltage wave forms occurring at junction nodes V1, V2 and V3 on the bus in FIG. 6 during the data transfer from module 100 to module 110 are simulated to obtain results as exemplified in FIG. 7.

At time t1, voltage at the junction node V1 of the module 100 becomes high level and a change of voltage from low level to high level propagates on the bus part 202 from the module 100 to the module 110. Subsequently, at time t2, voltage at the junction node V2 of the module 110 becomes high level.

At time t3 following a propagation delay time of the bus part 203, a change of voltage from low level to high level reaches the junction node V3 of the module 120. When the voltage change reaches the junction node V3 at the time t3, part of the voltage change is reflected and returned by the capacitor 122 representative of the equivalent input capacitive component of the module 120, producing a valley-like waveform distortion 901 in the voltage waveform at the node point V2 at time t4 (t3−t2=t4−t3).

As shown in FIG. 6, in the module 110 (modules 100 and 120 likewise), the input circuit in the form of the comparator 111 compares a threshold voltage Vth, which is a predetermined DC voltage, with the voltage at the junction node V2. Then, if the voltage at the junction node V2 is higher than the threshold voltage Vth, data of "1" is recognized but if lower, data of "0" is recognized.

Pursuant to general characteristics of the comparator 111, the voltage at the junction node V2 of the module 110 cannot sometimes be recognized correctly in a range covering the close proximity to the threshold voltage Vth. This range is called a blind zone which is designated by 801 in FIG. 7. Thus, even when the module 110 tries to fetch the voltage at the junction node V2 near the time t4, a voltage Vp1 associated with the waveform distortion 901 comes at the blind zone 801 and recognition of data "1" cannot always be warranted.

As described above, even in the matching termination bus such as the GTL interface, the waveform is distorted under the influence of the reflection by the capacitive component owned by the module and correct data transfer is sometimes prevented. This problem is raise by the steep rise time and fall time of output signals concomitant with the fineness of semiconductors and the promoted operating frequency of the bus and has not hitherto surfaced.

One method of solving the aforementioned problem is given by the SSTL interface disclosed in JP-A-8-286793. The SSTL interface, however, presupposes a push-pull type (low/high drive is effected by a pMOS transistor and an nMOS transistor) interface and cannot be applied to an open drain type (only the low side is driven by an nMOS transistor) interface which can be of wired OR connection. Another method of inserting a dumping resistor has hitherto been known and is applicable to the TTL interface. Essentially, however, this conventional method intends to control the output end impedance in unidirectional transmission and its application to the bidirectional bus is difficult to achieve.

SUMMARY OF THE INVENTION

Accordingly, the present invention contemplates solving the above problems and it is an object of the present invention to provide a technique which can decrease the influence of reflection from an equivalent input capacitive component of a module coupled to an open drain type bus to permit more high-speed and accurate signal transmission.

To accomplish the above object, according to one aspect of the present invention, a bus system comprises a bus constructed of a plurality of signal lines for transmission of signals, first and second terminating resistors connected to both ends of the respective signal lines, first, second and third modules coupled to the bus between the first and second terminating resistors and being each operative to deliver a signal through an open drain type output circuit, first series resistors inserted in the respective signal lines between the first and second modules, and second series resistors inserted in the respective signal lines between the second and third modules.

According to another aspect of the present invention, a memory system comprises a bus constructed of a plurality of signal lines for transmission of signals, first and second terminating resistors connected to both ends of the respective signal lines, a first memory buffer, a memory controller and a second memory buffer which are coupled to the bus between the two terminating resistors and are each operative to transmit a signal through an open drain type output circuit, first series resistors provided in the respective signal lines between the first memory buffer and the memory controller, and second series resistors provided in the respective signal lines between the memory controller and the second memory buffer.

BRIEF DESCRIPTION OF THE DRAWINGS

FIG. 7 illustrates time charts showing results of simulation of a signal waveform in the prior art bus system.

DESCRIPTION OF THE EMBODIMENTS

1. Construction

Figure 1:
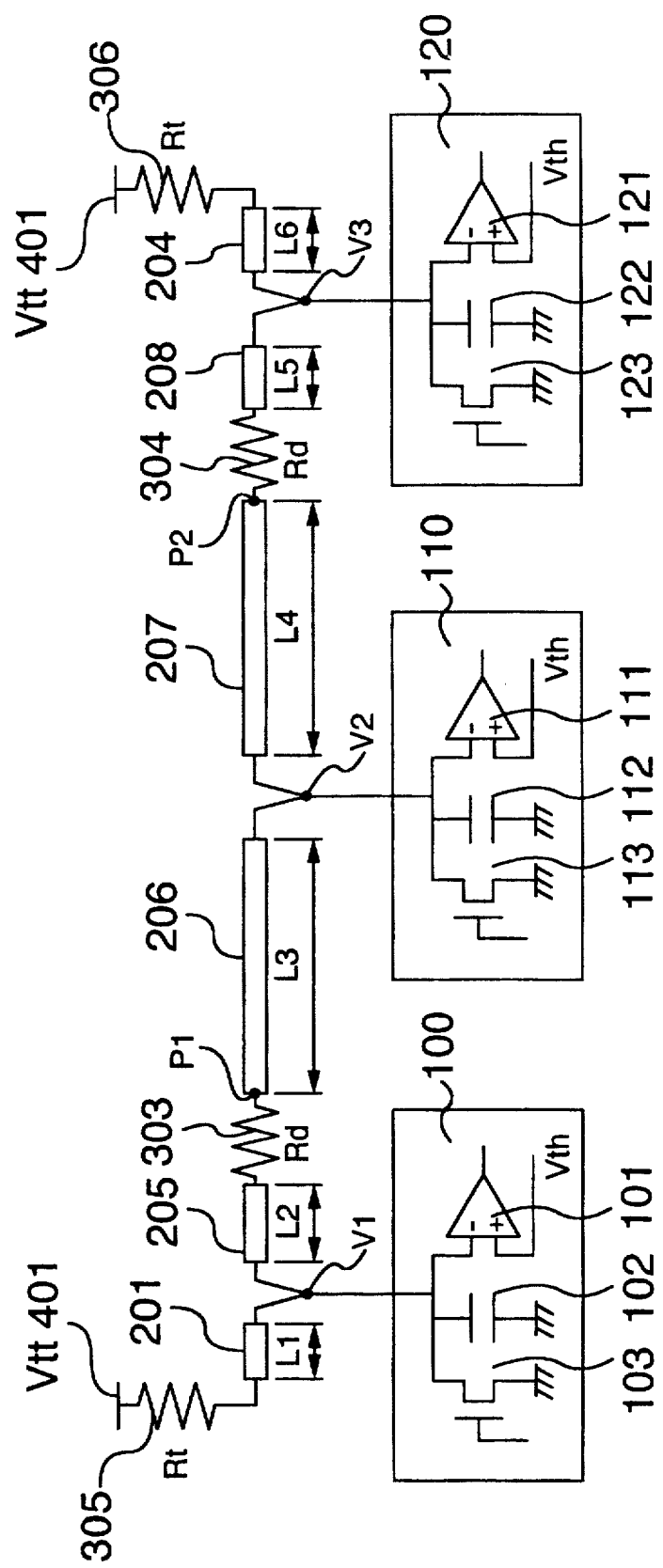
FIG. 1 is a block diagram showing the construction of a bus system according to the present invention.

Referring now to FIG. 1, the construction of a bus system according to an embodiment of the invention will be described.

The bus system of the present embodiment comprises, as shown in FIG. 1, terminating resistors Rt 305 and Rt 306, modules 100, 110 and 120, bus parts 201, 204, 205, 206, 207 and 208 for transfer of data, a series resistor Rd 303 interposed between the modules 100 and 110, and a series resistor Rd 304 interposed between the modules 110 and 120. The bus takes a wiring form of single stroke wiring starting with the terminating resistor Rt 305, going through the modules 100, 110 and 120 and ending in the terminating resistor Rt 306. The series resistor referred to herein represents the resistor connected between the modules in series therewith.

The modules 100, 110 and 120 are integrated circuits having GTL interfaces. The individual interface circuits include input circuits in the form of comparators 101, 111 and 121, output circuits in the form of MOS transistors 103, 113 and 123, and capacitors 102, 112 and 122 equivalent to capacitive components C of the input circuits (here, comparators 101, 111 and 121).

Figure 6:
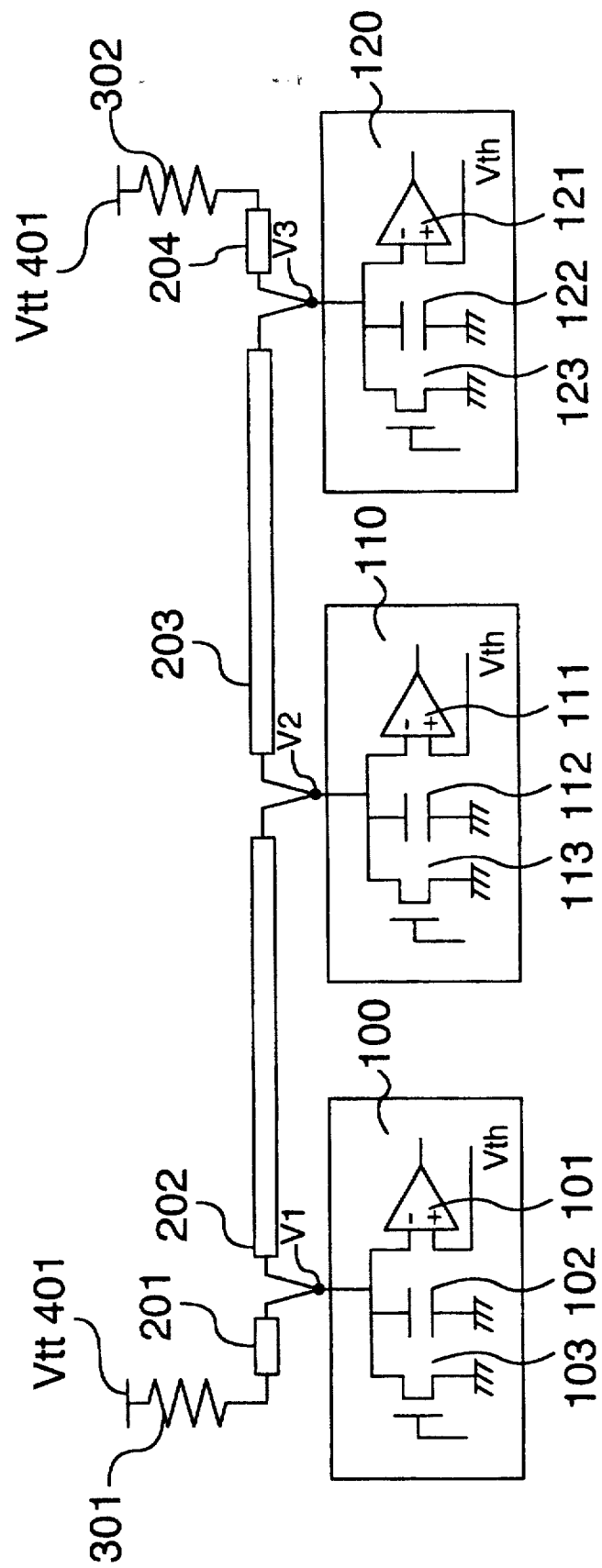
FIG. 6 is a block diagram showing a prior art bus system.

Because of the insertion of the series resistors Rd 303 and Rd 304, the bus part 202 in FIG. 6 is divided into the bus parts 205 and 206 in FIG. 1 and the bus part 203 in FIG. 6 is divided into the bus parts 207 and 208 in FIG. 1.

These elements are formed on a printed wiring board and the bus parts 205, 206, 207 and 208 are printed on the board. Alternatively, these elements may be formed separately on a plurality of printed wiring boards. In that case, the bus parts printed on the boards are connected to each other through connectors.

Only one bit signal line of bus is illustrated in FIG. 1 and practically, circuit configurations each having the construction shown in FIG. 1 are arranged in parallel by the number corresponding to a bit width of bus.

2. Determination of Position and Value (Resistance) of Series Resistor

With the construction of FIG. 1, simulation is carried out to determine optimum value and position of the series resistor Rd.

An analog simulator on a computer is used for simulation. Known as the analog simulator is HSPICE of Meta Wave Corp. or XTK of View Logic Corp. In either analog simulator, elements of circuits, connection between the elements, topology, the input/output characteristics of the elements and input signals are described in prescribed language so that voltage and current values at arbitrary points in the circuits may be obtained in time series.

Presupposed conditions for execution of the simulation will be described.

In general, the characteristic impedance of the bus on the printed wiring board is determined substantially by dielectric constant of the board, the bus position in cross section of the board and the width of each signal line of the bus. When the bus is matching-terminated, the length of the bus and the distance between signal lines of the bus can be considered to be infinite. Accordingly, the factors hardly affect the determination of the impedance value. Generally, the impedance has a component related to direct current (resistance) and a component related to alternating current (reactance) but in the case of the bus, a component related to direct current largely affect the impedance and the impedance may be considered to have equivalently only a component related to direct current. Accordingly, the characteristic impedance of the bus is defined as Z0 regardless of the length, shape and signal frequency.

Rise time Tr and fall time Tf of a signal are defined as follows. It is now assumed that when a step input of 0 to 1 is received at an input point, voltage at a certain point changes from $V_0$ to $V_{100}$. Then, $V_{100}-V_0$ is equally divided by 10 and the time required for the voltage to change from $V_0+(V_{100}-V_0)/10$ to $V_0+9\times(V_{100}-V_0)/10$ is defined as the rise time Tr and similarly, the time required for the voltage to change from 90% to 10% of peak voltage is defined as the fall time Tf.

It is important for transmission of signals between modules to avoid multiple reflection of signals on the bus. When a signal is transmitted from the module 110 to the modules 100 and 120 in FIG. 1, the reflections may occur at input ports P1 and P2 of the series resistors Rd and at input junction nodes V1 and V3 of the modules 100 and 120. Conditions of avoidance of reflection at the input ports P1 and P2 will be described.

Assumptively, the bus parts 201, 205, 208 and 204 have wiring lengths L1, L2, L5 and L6, respectively. In case the time for a signal to propagate on the bus parts 208 and 204 is sufficiently shorter than the time for the signal to change, the bus can be analyzed by taking it for a lumped constant circuit. More particularly, when each of the sum (L1+L2) of wiring lengths of the bus parts 201 and 205 and the sum (L5+L6) of the bus parts 208 and 204 is sufficiently smaller than the product of signal rise time Tr and propagation speed vp or the product of signal fall time Tf and propagation speed vp, the series resistor Rd and terminating resistor Rt can apparently be deemed to be a single resultant resistor (Rd+Rt). From this view point, the wiring lengths (L1+L2) and (L5+L6) satisfying the following range related to the signal rise time Tr and signal propagation speed vp as indicated by expressions (1) and (2) are used:

$$L1+L2 \leq Lf \times Tr \times vp \text{[mm]} \tag{1}$$

$$L5+L6 \leq Lf \times Tr \times vp \text{[mm]} \tag{2}$$

where Lf is a constant not greater than 1 (one).

Figures 2A, 2B:
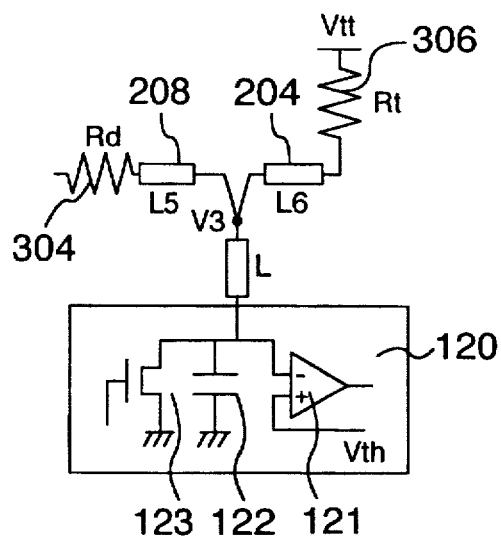
FIG. 2A is a circuit diagram used to simulate the length of wiring in the bus system.
FIG. 2B shows results of the simulation.

In order to determine conditions of avoiding reflection at the input junction node of the module 120, simulation is conducted with a circuit constructed as shown in FIG. 2A.

The fragmentary circuit shown in FIG. 2A corresponds to the module 120 shown in FIG. 1 and the neighboring bus parts coupled to the module 120, including the module 120, the bus parts 208 (wiring length: L5) and 204 (wiring length: L6), the series resistor Rd 304 and the terminating resistor 306.

On the basis of the generally used digital circuit board and specifications of the GTL interface, parameters in the simulation are set as follows:

(A) Each of the bus parts 204 and 208 has a characteristic impedance Z0 of 66Ω, (B) Rt 306+Rd 304=66Ω, and (C) Terminating voltage Vtt 401=1.2V.

On the assumption that a line width of 0.25 μm is produced with the present-day advanced semiconductor fabrication technique, the characteristics of the module 120 are set as follows:

(D) The module 120 has an output equivalent resistance Ron of 8Ω, (E) The output signal of the module 120 has a rise time Tr of 0.8 ns, and (F) The capacitor 122 has a capacitance C of 8 pF.

The present simulation indicates the influence of a ringback voltage (reflected wave) Vr from the capacitor 122 in the input circuit of the module 120 when the wiring length of the bus part 204 and a wiring length L between the bus and the module are fixed. In addition, in the simulation, the range of blind zone of the module 120 is set to extend from 0.64 V to 0.96 V and the propagation speed vp is set to 140 mm/ns.

Results of the simulation are indicated in FIG. 2B.

FIG. 2B demonstrates that when the simulation is conducted for the wiring length L5 of the bus part 208 being 10 mm, 50 mm, 80 mm, 100 mm and 150 mm under the aforementioned conditions, the reflected wave Vr increases to come at the blind zone in case the wiring length L5 of the bus part 209 exceeds 50 mm.

By reducing expression (2) to $$Lf \leq (L5+L6)/(vp \times Tr)$$

and by substituting the parameter values, $$Lf \leq (50+15)/(140 \times 0.8)$$

stands and $$Lf \leq 0.6 \tag{3}$$

results.

In the simulation, Lf≤0.6 stands for the coefficient but this does not take into account unexpected noise generated in the actual environment in which the bus system is actually placed. Therefore, by allowing a margin, the coefficient may more preferably be given by Lf≈0.4. In the present simulation, the coefficient Lf is determined by referring to expression (2) but it may be determined similarly by referring to expression (1).

In addition, by making the resultant resistor (Rt+Rd) equal to the characteristic impedance Z0 of the bus in order to match them, the reflection from the end point of the bus can be minimized. Ideally, to permit the matching termination, it is desirable that the aforementioned resultant resistance (Rt+Rd) and the characteristic impedance Z0 be the same value but because of irregularities in the fabrication process of the board and the quality of materials, the value of the characteristic impedance Z0 changes. Accordingly, the value or resistance of the resultant resistor ((Rt+Rd) is desired to be in the range which is ±20% of the characteristic impedance Z0 as indicated by expression (4):

$$0.8 \times Z0 \text{[}\Omega\text{]} \leq Rt+Rd \leq 1.2 \times Z0 \text{[}\Omega\text{]} \tag{4}$$

From the above, the optimum conditions for the position (L1+L2, L5+L6) on bus of the series resistor Rd and resistance of the resultant resistor (Rd+Rt) are determined.

Next, the optimum range of values of each series resistor Rd 303 or Rd 304 will be determined. In addition to the aforementioned optimization of the wiring length, the resistance value of each of the series resistors Rd 303 and Rd 304 acts on decreasing the reflected wave Vr from the capacitor 122 and the larger the resistance, the decrease can be accomplished more effectively. On the other hand, when the resistance of each of the series resistors Rd 303 and Rd 304 is large, the signal amplitude is suppressed, so that voltage especially on the low level side is boosted and the margin for external disturbance of signal (noise) is decreased. In other words, there is a possibility that depending on noise, data transfer cannot be carried out normally between the modules. Values of the series resistors Rd 303 and Rd 304 which can maintain a noise margin will be determined.

Reverting to FIG. 1, the reflected wave Vrp at the P2 position and the influence of the reflected wave upon the input junction node voltage V2 of the module 110 will be studied. The influence of the reflected wave Vr due to the capacitive component of the module 120 is reflected on the reflected wave Vrp.

When the bus having the characteristic impedance Z0 terminates in a load Zr, a reflected wave Vrp corresponding to an input wave Vin is defined by expression (5) on the basis of the transmission theory.

$$Vrp=(Zr-Z0)/(Zr+Z0) \times Vin \text{[V]} \tag{5}$$

where Zr representing the load is an impedance of a part on the right side of P2. Actually, the module 120 has the capacitive component C (capacitor 122) in the input gate and consequently, the load Zr can be given by a resultant resistance of the series resistor Rd 304, terminating resistor Rt 306 and capacitor C 122 as indicated by expression (6). The impedance of each of the bus parts 208 and 204 is negligible, since the bus length is short enough when considering the rise time and fall time of input signal.

$$Zr=Rd+Rt/(j \times \omega \times C \times Rt+1) \text{[}\Omega\text{]} \tag{6}$$

where j represents the imaginary number and ω represents the angular frequency. An actual condition that the input signal Vin is not a step response input (both the rise and fall times are 0 (zero) second) but is indicated by expression (7) is presupposed so that the rise time Tr may be introduced and the voltage amplitude may be set to 1.2 V.

$$Vin=1.2/Trxt[V](0 \leq t \leq Tr)=1.2[V](Tr \leq t) \quad (7)$$

By solving the differential equation using Laplace transform and Laplace inverse transform with expressions (5), (6) and (7), maximum value Vrp-max of the reflected wave Vrp at the P2 port can be determined as follows:

$$Vrp\text{-}max=-1.2 \times C \times (Z0-Rd) \times (Z0-Rd)/(2 \times Z0 \times Tr) \times (1-e^{**}(-2 \cdot Z0 \times Tr/(C \times (Z0-Rd) \times (Z0+Rd))))[V] \quad (8)$$

where e is the base of natural logarithm, and ** means power operation.

Next, low side voltage Vil of the module 110 during the application of voltage from the bus to the module 110 will be described. Practically, the low side input voltage Vil is not always at a constant voltage level but its voltage level changes with time. Namely, immediately after the voltage level is switched from high to low, the transmission line should be analyzed by taking it for a distributed constant circuit and in case the low level keeps continuing for a few periods, this state should be considered to be a steady state to determine the low side input voltage Vil.

Where the wiring length of the bus part 205 is L2, the wiring length of the bus part 206 is L3, the wiring length of the bus part 207 is L4 and the wiring length of the bus part 208 is L5, time T1 for analysis of the transmission line is determined from the propagation speed vp of signal transmission as indicated by expression (9).

$$T1=2 \cdot (L2+L3+L4+L5)/vp[s] \quad (9)$$

Accordingly, during time T1 following the signal rise, the low side input voltage Vil1 is determined in accordance with expression (10) by taking the transmission line for the distributed constant circuit.

$$Vil1=Ron \times (Rd+Rt+Z0)/\{Rt \times (Rd+Z0)+Ron\} \times Vtt[V] \quad (10)$$

where Ron represents internal resistance of the module 110 and Vtt is terminating voltage of the bus.

On the other hand, after the time T1, the steady state proceeds and input voltage Vil2 in this state is given by expression (11).

$$Vil2=(2 \cdot Ron+Rd)/(2 \cdot Ron+Rt+Rd) \times Vtt[V] \quad (11)$$

From expressions (8), (10) and (11), the relation between each of the reflected wave Vrp-max and voltages Vil1 and Vil2 applied to the module 110 and each of the resistance and impedance in the circuit has been derived.

Simulation of voltage waveforms at the junction nodes V1, V2 and V3 on the bus during data transfer from module 100 to module 110 in the bus system shown in FIG. 1 is conducted using an analog simulator.

Here, the range of values used in the general bus interface will be used.

(I) The output equivalent resistance Ron of the module 110 is $4\Omega \leq Ron \leq 9\Omega$, (J) The capacitive component C of the module 120 is 4 pF$\leq C \leq$8 pF, and (K) The characteristic impedance Z0 is $50\Omega \leq Z0 \leq 70\Omega$.

Figure 3:
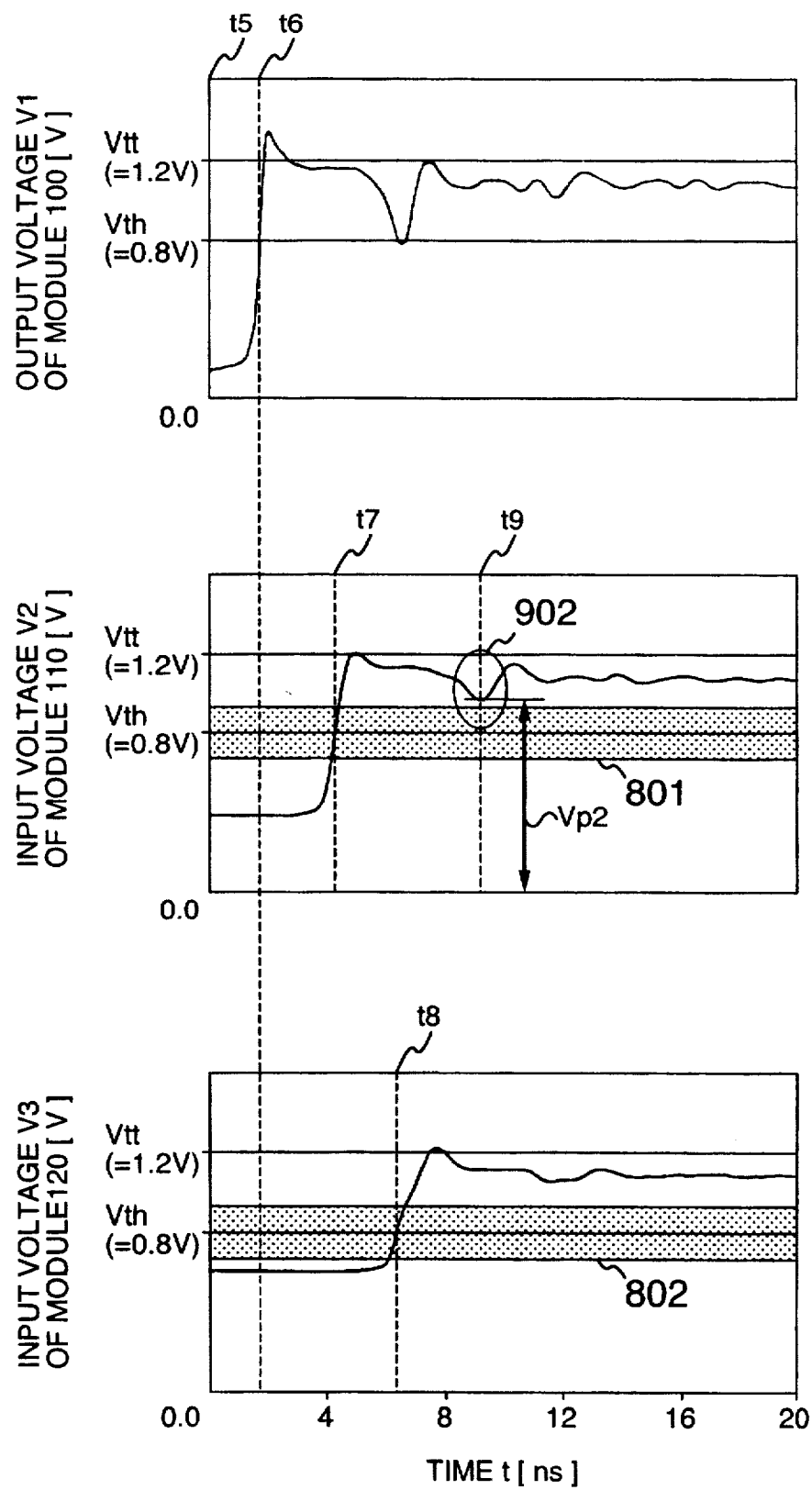
FIG. 3 illustrates time charts showing results of simulation of a signal waveform in the bus system.

Voltages at the input junction nodes of the individual modules change as shown in FIG. 3.

A blind zone 801 of module 110 shown in FIG. 3 is a range of voltage width which is ±0.16 V about the center of threshold voltage Vth. Thus, in order for a signal voltage at the junction node V2 not to come at the blind zone 801, the influence, as indicated by Vrp, of the reflected wave Vr by the capacitor 122 of the module 120 must be suppressed to be within 0.24 V. Also, the low side voltage at the junction node V2 must be in the range of from 0.4 to 0.6 V.

These conditions can be expressed by the following expressions:

(G) The influence Vrp of the capacitive component C of the module 120 is Vrp$\leq$0.24V, and (H) The low side input voltage Vil of the module 110 is 0.4V$\leq$Vil$\leq$0.6V.

From the parameters indicated in (G) to (K) and expressions (8), (9) and (11), an optimum range of each of the series resistors Rd 303 and Rd 304 can be determined by expressions (12) and (13).

$$5\Omega \leq Rd \leq 26\Omega \quad (12)$$

$$Rt:Rd=2:1 \quad (13)$$

3. Verification

By using resistances determined as above, that is, (L) Each of the terminating resistors Rt 301 and Rt 302 being 44Ω, and (M) Each of the series resistors Rd 303 and Rd 304 being 22Ω, the behavior of signal transmission in the bus system of FIG. 1 will be verified again by means of the analog simulator.

In FIG. 3, a signal of the module 100 begins to be delivered at reference time t5. At time t6, voltage at the junction node V1 of the module 100 becomes high level and propagates toward the module 110 through the bus part 205, series resistor Rt 303 and bus part 206.

At subsequent time t7, voltage at the junction node V2 of the module 110 changes from low level to high level. Since the sum (L2+L3) of wiring lengths of the bus parts 205 and 206 is about 320 mm, the propagation delay time (t7–t6) is about 2.4 ns.

At time t8, the change from low level to high level reaches the module 120 through the bus part 207 (about 290 mm), series resistor Rd 304 and bus part 208 (about 10 mm) and voltage at the junction node V3 changes to high level. At that time, a reflected wave Vr is generated by the capacitor 122. The thus generated reflected wave Vr is returned through the bus part 208, series Rd 304 and bus part 207, causing a wave distortion 902 at the junction node V2 of the module 110 at time t9 (t8–t7=t9–t8). However, the magnitude of the generated reflected wave Vr passed through the series resistor Rd 304 is attenuated.

The wave distortion 902 generated at the junction node V2 at the time t9 approaches the range of blind zone 801 of the comparator 111 but does not come into the range of blind zone 801. As a result, the voltage difference between the voltage at the junction node V2 and the threshold voltage Vth is sufficient, enabling the comparator 111 to correctly recognize data "1". Namely, while an indefinite value is liable to be fetched near the time t4 in FIG. 7, the voltage at the junction node V2 of the module 110 can be fetched near the time t9 in the present embodiment.

Comparison of voltage Vp1 equal to 0.85V at the lowest level of the wave distortion 901 shown in FIG. 7 with voltage Vp2 equal to 0.98 V at the lowest level of the wave distortion 902 shown in FIG. 3 demonstrates that the bus system according to the present embodiment can decrease the influence of the reflected wave from the module by 0.13V. Accordingly, the effect of reducing the reflected wave Vr can be attained by the series resistor Rd 304, thereby ensuring that data can be transferred correctly from the module 100 to the module 110.

While the data transfer from module 100 to module 110 has been described with reference to FIGS. 1 and 3, data transfer from module 120 to module 110 can be conducted similarly.

Figure 4:
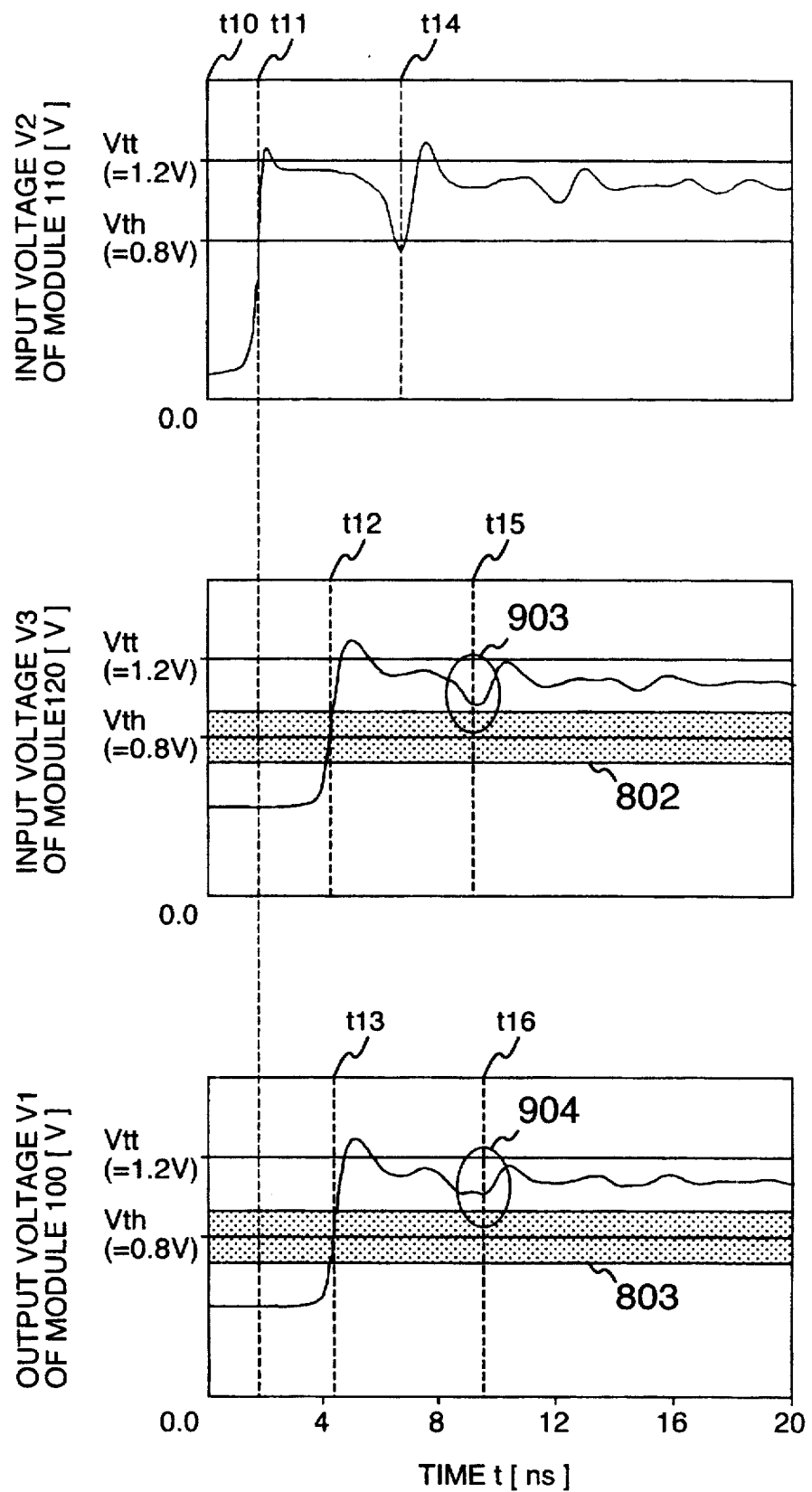
FIG. 4 also illustrates time charts showing results of simulation of a signal waveform in the bus system.

Next, data transfer from module 110 to module 120 will be described with reference to FIGS. 1 and 4. Parameters used in simulation are conditioned to (A), (C), (D), (E), (F), (L) and (M) similarly to the case of FIG. 3.

At reference time equal to time t10, the module 110 begins to deliver a signal. At subsequent time t11, voltage at the junction node V2 of the module 110 becomes high level and a change of voltage from low level to high level propagates from the module 110 to the modules 120 and 100 through the bus parts 206 and 207.

The voltage change directed to the module 120, on the one hand, reaches the module 120 at time t12 and the voltage change directed to the module 100, on the other hand, reaches the module 100 at time t13.

At the time t12, voltage at the junction node V3 changes from low level to high level. At that time, a reflected wave Vr1 is generated by the capacitor 122 and is returned to the module 110 through the bus part 208, series resistor Rd 304 and bus part 207. The magnitude of the reflected wave Vr1 passed through the series resistor Rd 304 is attenuated.

Similarly, voltage at the junction node V1 changes from low level to high level at the time t13. At that time, a reflected wave Vr2 is generated by the capacitor 102 and returned to the module 110 through the bus part 205, series resistor 303 and bus part 206. The magnitude of the reflected wave Vr2 passed through the series resistor Rd 304 is attenuated.

The reflected waves Vr1 and Vr2 generated by the modules 120 and 100 cause a distortion in voltage waveform at the junction node V2. Since the difference (about 20 mm) in wiring length between the bus parts 206 and 207 is sufficiently smaller than the propagation speed (about 140 mm/s), the reflected waves Vr1 and Vr2 overlap, thus causing a large valley-like wave distortion at the time t14. Thereafter, the reflected wave Vr1 propagates toward the module 100 through the bus part 206 and the reflected wave Vr2 propagates toward the module 120 through the bus part 207. The reflected waves Vr1 and Vr2 are again attenuated by means of the series resistors Rd 303 and Rd 304, respectively.

At time t15, the reflected wave Vr2 reaches the module 120, causing a waveform distortion 903 at the junction node V3. Since the wave form distortion 903 does not come into a blind zone 802 of the module 120, the module 120 can recognize data "1" correctly, thereby assuring data transfer from module 110 to module 120. While the data transfer from module 110 to module 120 has been described, data transfer from module 110 to module 100 can be effected similarly.

Next, data transfer from module 100 to module 120 will be described with reference to FIGS. 1 and 3.

At reference time t5, the module 100 begins to deliver a signal and voltage at the junction node V3 of the module 120 changes from low level to high level at time t8. A reflected wave Vr generated by the capacitor 122 at the time t8 propagates to the modules 110 and 100 but it is attenuated by the series resistors Rd 304 and Rd 303 on the way without greatly affecting a voltage waveform at the junction node V3 of the module 120, so that the voltage at the junction node V3 can keep high level. As a result, the module 120 can fetch data "1" transferred from the module 100, thus permitting data transfer from module 100 to module 120. While the data transfer from module 100 to module 120 has been described with reference to FIG. 3, data transfer from module 120 to module 100 can be effected similarly.

From the above, the reflection due to the capacitive component C of the module can be suppressed by arranging the terminating resistor Rt and series resistor Rd which satisfy the relation indicated by expression (4) at positions satisfying expressions (1), (2) and (3). In other words, the reflection increased by steep rise time Tr and fall time Tf can be suppressed. Accordingly, even when the operating frequency of the bus is promoted, distortion in the signal waveform at the input junction node can be suppressed to thereby permit high-speed and accurate data transfer between the modules.

4. Applied Example

Figure 5:
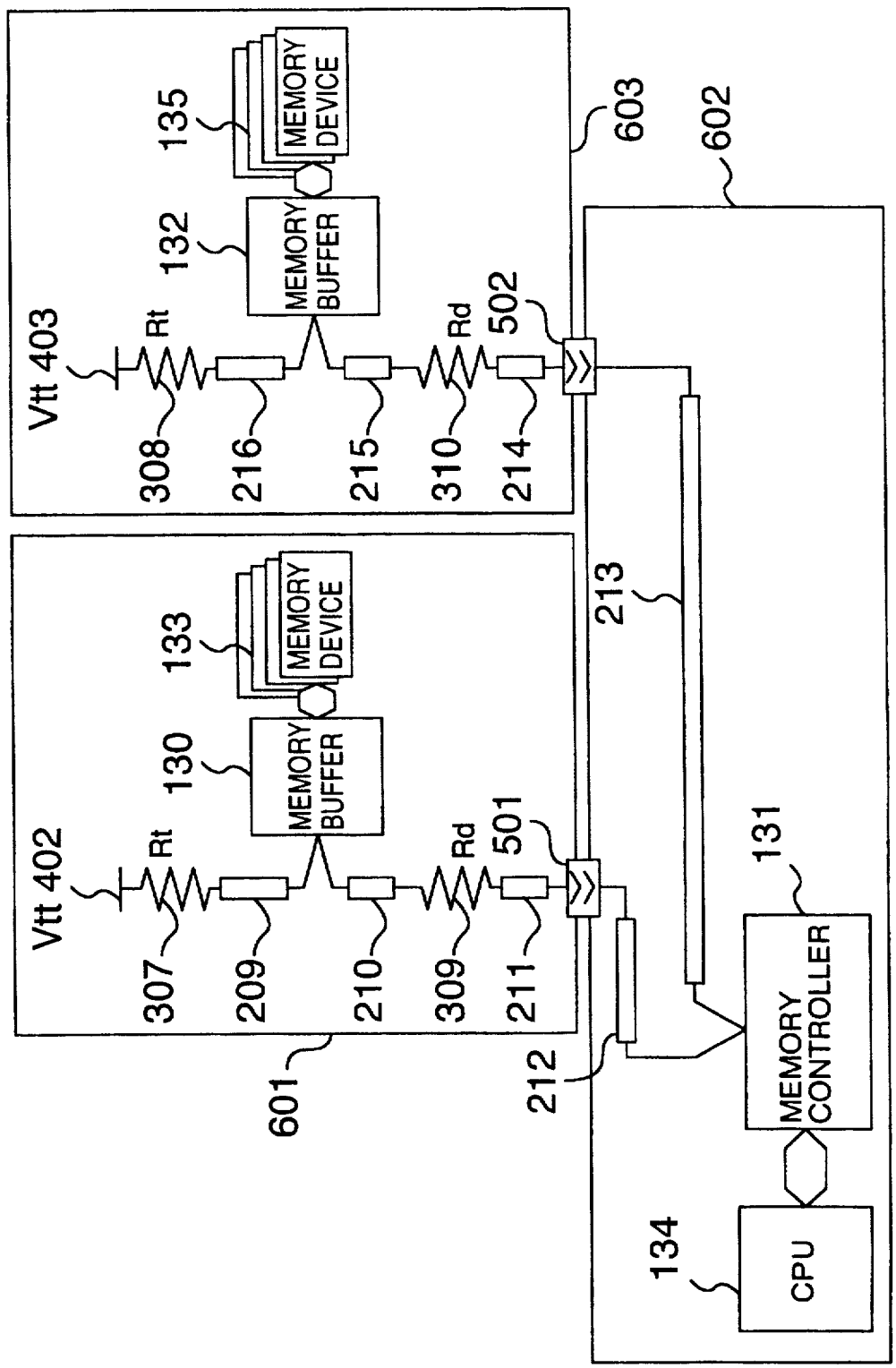
FIG. 5 is a block diagram showing the construction of a memory system to which the invention is applied.

Referring now to FIG. 5, a memory system to which the bus system shown in FIG. 1 is applied will be described.

The memory system shown in FIG. 5 comprises a main board 602 and two memory boards 601 and 603. A CPU (Central Processing Unit) 134 and a memory controller 131 are carried on the main board 602, a memory device 133 and a memory buffer 130 are carried on the memory board 601 and a memory device 135 and a memory buffer 132 are carried on the memory board 603. Data is transferred between the CPU 134 and each of the memory devices 133 and 135. In this example, the memory controller 131 corresponds to the module 110 in FIG. 1, the memory buffers 130 and 132 correspond to the modules 100 and 120 in FIG. 1, respectively, terminating resistors Rt 307 and Rt 308 correspond to the terminating resistors Rt 305 and Rt 306 in FIG. 1, respectively, series resistors Rd 309 and Rd 310 correspond to the series resistors Rd 303 and Rd 304 in FIG. 1, respectively.

It is now assumed that data transfer is performed between the main controller 131 and each of the memory buffers 130 and 132 but data transfer is not performed between the memory buffers 130 and 132. Details of a bus between the CPU 134 and the memory controller 131, of a bus between the memory device 133 and the memory buffer 130 and of a bus between the memory device 135 and the memory buffer 132 will not be described.

In the memory system shown in FIG. 5, a signal line takes a wiring form of single stroke wiring starting with the terminating resistor Rt 307, going through the memory buffer 130, series resistor Rd 309, connector 501, memory controller 131, connector 502, series resistor Rd 310 and buffer memory 132 and ending in the terminating resistor Rt 308.

Accordingly, even when the operating frequency of the bus is promoted, data transfer can be assured between the memory buffer 130 and the main controller 131 and between the memory buffer 132 and the main controller 131.

5. Modification

The foregoing embodiment has been described as having three modules but the present invention is in no way limited thereto. When there are three or more plural modules, individual series resistors are inserted in bus parts between individual adjacent modules. In this case, too, simulation can be conducted similarly to the case of three modules to determine the resistance value of each series resistor from the conditions of preventing the reflection.

In the foregoing embodiment, the module has been described as having the GTL interface but the present invention can also be applied to a module having a different type of interface belonging to the open drain type interface, for example, a part of TTL interface.

In the applied example, the two memory buffers are coupled to the single memory controller through the bus but the present invention can be applied to a module having any function, provided that the module has the open drain type interface.

What is claimed is:

1. A bus system comprising:

a bus constructed of a plurality of signal lines for transmission of signals;

first and second terminating resistors provided at both ends of the bus;

first, second and third modules each of which is operative to transmit a signal through an output circuit of open drain type, said first module connected with said bus at first junctions of said signal lines, said second module connected with said bus at second junctions of said signal lines, and said third module connected with said bus at third junctions of said signal lines;

first series resistors inserted in a junction of the signal lines between said first and second junctions; and second series resistors inserted in a junction of the signal lines between said second and third junctions.

2. A bus system according to claim 1, wherein a series resultant resistance of said first terminating resistor and said first series resistor and a series resultant resistance of said second terminating resistor and said second series resistor have each a value which is in the range of from 0.8 times to 1.2 times a characteristic impedance of said bus.

3. A bus system according to claim 2, wherein, where the length of a bus part between said first terminating resistor and said first junction and the length of a bus part between said second terminating resistor and said third junction are L1, the length of a bus part between said first series resistor and said first junction and the length of a bus part between said second series resistor and said third junction are L2, the rise time of a signal is Tr and the signal propagation speed is vp, $$L1+L2 \leq 0.6*Tr*vp$$

stands.

4. A bus system according to claim 2, wherein the ratio between resistance values of said first terminating resistor and said first series resistor and the ratio between resistance values of said second terminating resistor and said second series resistor are respectively 2:1.

5. A bus system according to claim 1, wherein each module has a GTL interface.

6. A bus system according to claim 1, wherein said bus is printed on a printed wiring board.

7. A bus system comprising:

a bus constructed of a plurality of signal lines for transmission of signals;

first and second terminating resistors provided at both ends of the bus;

a plurality of modules connected with said bus at a plurality of junctions of said signal lines and being each operative to transmit a signal through an output circuit of open drain type; and series resistors provided in junction of the signal lines between said plurality of junctions of said signal lines.

8. A bus system according to claim 7, wherein a series resultant resistance of said first terminating resistor and said first series resistor and a series resultant resistance of said second terminating resistor and said second series resistor each have a value which is in the range of from 0.8 times to 1.2 times a characteristic impedance of said bus.

9. A bus system according to claim 8, wherein the ratio between resistance values of said first terminating resistor and said first series resistor and the ratio between resistance values of said second terminating resistor and said second series resistor are respectively 2:1.

10. A bus system according to claim 7, wherein a number of said modules is three, the modules are connected to the first, second and third junctions respectively, and a number of said series resistors is two.

11. A bus system according to claim 10, wherein, where the length of a bus part between said first terminating resistor and the first junction and the length of a bus part between said second terminating resistor and the third junction are L1, the length of a bus part between said first series resistor and the first junction and the length of a bus part between said second series resistor and the third junction are L2, the rise time of a signal is Tr and the signal propagation speed is vp, $$L1+L2 \leq 0.6*Tr*vp$$

stands.

12. A bus system according to claim 7, wherein each module has a GTL interface.

13. A bus system according to claim 7, wherein said bus is printed on a printed wiring board.

14. A memory system comprising:

a bus constructed of a plurality of signal lines for transmission of signals;

first and second terminating resistors provided at both ends of the bus;

a first memory buffer, a memory controller and a second memory buffer each of which is operative to transmit a signal through an output circuit of open drain type, said first memory buffer connected with said bus at first junctions of the signal lines, said memory controller connected with said bus at second junctions of the signal lines, and said second memory buffer connected with said bus at third junctions of the signal lines;

first series resistors inserted in the signal lines between said first and second junctions; and second series resistors inserted in the signal lines between said second and third junctions.

15. A memory system according to claim 14, wherein a series resultant resistance of said first terminating resistor and said first series resistor and a series resultant resistance of said second terminating resistor and said second series resistor respectively have a value which is in the range of from 0.8 times to 1.2 times a characteristic impedance of said bus.

16. A memory system according to claim 15, wherein, where the length of a bus part between said first terminating resistor and said first junction and the length of a bus part between said second terminating resistor and said third junction are L1, the length of a bus part between said first series resistor and said first junction and the length of a bus part between said second series resistor and said third junction are L2, the rise time of a signal is Tr and the signal propagation speed is vp, $$L1+L2 \leq 0.6*Tr*vp$$

stands.

17. A memory system according to claim 15, wherein the ratio between resistance values of said first terminating resistor and said first series resistor and the ratio between resistance values of said second terminating resistor and said second series resistor are respectively 2:1.

18. A memory system according to claim 14, wherein each of the memory buffers and the memory controller has a GTL interface.

19. A memory system according to claim 14, wherein said bus is printed on a printed wiring board.

20. A bus system comprising:

a bus constructed of a plurality of signal lines for transmission of signals;

first and second terminating resistors provided at both ends of the respective signal lines;

first, second and third modules coupled to said bus between said first and second terminating resistors and being each operative to transmit a signal through an output circuit of open drain type;

first series resistors inserted in the respective signal lines between said first and second modules; and second series resistors inserted in the respective signal lines between said second and third modules, wherein a series resultant resistance of said first terminating resistor and said first series resistor and a series resultant resistance of said second terminating resistor and said second series resistor each have a value which is in the range of from 0.8 times to 1.2 times a characteristic impedance of said bus.

21. A memory system comprising:

a bus constructed of a plurality of signal lines for transmission of signals;

first and second terminating resistors provided at both ends of the respective signal lines;

a first memory buffer, a memory controller and a second memory buffer which are coupled to said bus between said first and second terminating resistors and which are each operative to transmit a signal through an output circuit of open drain type;

first series resistors inserted in the respective signal lines between said first memory buffer and said memory controller; and second series resistors inserted in the respective signal lines between said memory controller and said second memory buffer, wherein a series resultant resistance of said first terminating resistor and said first series resistor and a series resultant resistance of said second terminating resistor and said second series resistor respectively have a value which is in the range of from 0.8 times to 1.2 times a characteristic impedance of said bus.

* * * * *